United States Patent [19]
Lemke et al.

[11] Patent Number: 6,122,143
[45] Date of Patent: Sep. 19, 2000

[54] WET RIGID DISK DRIVE ASSEMBLY WITH A CONICAL SPINDLE BEARING

[75] Inventors: James U. Lemke, San Diego; William W. French, Encinitas, both of Calif.

[73] Assignee: Visqus Corporation

[21] Appl. No.: 07/587,620

[22] Filed: Sep. 20, 1990

Related U.S. Application Data

[63] Continuation of application No. 07/314,999, Feb. 24, 1989.
[51] Int. Cl.⁷ .............................. G11B 17/02; G11B 5/60
[52] U.S. Cl. ...................................... 360/99.08; 360/234.1
[58] Field of Search ................................ 360/102, 97.02, 360/98.07, 99.08

[56] References Cited

U.S. PATENT DOCUMENTS

| | | |
|---|---|---|
| 872,039 | 11/1907 | Adams . |
| 1,630,713 | 5/1927 | Meyer . |
| 1,990,548 | 2/1935 | Keller et al. . |
| 2,062,250 | 11/1936 | Moller . |
| 2,426,839 | 9/1947 | Miller ................................. 179/100.24 |
| 2,502,318 | 3/1950 | Fischer . |
| 2,603,697 | 7/1952 | Korte ...................................... 177/311 |
| 2,612,566 | 9/1952 | Anderson et al. .................... 179/100.2 |

(List continued on next page.)

FOREIGN PATENT DOCUMENTS

| | | |
|---|---|---|
| 1221164 | 4/1987 | Canada .......................... G03G 19/00 |
| 0213603 | of 0000 | European Pat. Off. ........ G11B 19/20 |
| 0127444 | 5/1984 | European Pat. Off. ........ G11B 17/02 |
| 0302606 | 2/1989 | European Pat. Off. ........ G11B 33/14 |
| 1239354 | 4/1967 | Germany . |
| 57-40753 | 3/1982 | Japan .............................. G11B 5/70 |
| 63-13638 | 4/1988 | Japan ............................. G11B 25/04 |
| PCT/US84/01224 | of 0000 | WIPO . |
| PCT/US88/00604 | of 0000 | WIPO . |

OTHER PUBLICATIONS

Peripherals, by Gary Stix, Associate Editor, p. 40.
Magnetic Recording, vol. II, D. C. Mee, et al., editors, copyright 1988 pp. 48–55.
InfoCorp Storage News Report, Storage Commentary—Sep. 30, 1988, Prairie 220 Form Factor.
Probing the News, Oct., 1988, Electronics, Here Comes the First 2.5–in. Winchester Drive, by Jonah McLeod.

(List continued on next page.)

*Primary Examiner*—A. J. Heinz
*Attorney, Agent, or Firm*—Baker & Maxham

[57] ABSTRACT

The invention concerns a disk drive assembly in which one or more rotating rigid disks are enclosed in a "wet" operating environment in which a liquid lubricant is circulated from the surface of the rotating disks, through a wicking material within the disk drive assembly, and back to the head-disk interface. The wet environment supports the provision of open conical bearings in the spindle and actuator portions of the head-disk-actuator (HDA) of the disk drive assembly.

9 Claims, 4 Drawing Sheets

U.S. PATENT DOCUMENTS

| | | |
|---|---|---|
| 2,614,169 | 10/1952 | Cohen et al. ............................ 178/17.5 |
| 2,629,605 | 2/1953 | Krisch ........................................ 274/38 |
| 2,656,420 | 10/1953 | Isberg .................................. 179/100.2 |
| 2,692,803 | 10/1954 | Gerard . |
| 2,722,463 | 11/1955 | Shaw et al. . |
| 2,736,106 | 2/1956 | Offen ........................................ 34/156 |
| 2,743,933 | 5/1956 | Baines ......................................... 219/3 |
| 2,772,135 | 11/1956 | Hollabaugh .............................. 346/74 |
| 2,862,781 | 12/1958 | Baumeister .............................. 346/74 |
| 2,928,709 | 3/1960 | Baumeister . |
| 2,969,435 | 1/1961 | Lynott . |
| 3,005,675 | 10/1961 | Ledin et al. . |
| 3,032,884 | 5/1962 | Collins et al. ............................ 33/185 |
| 3,065,460 | 11/1962 | Altenau ................................ 340/174.1 |
| 3,072,752 | 1/1963 | Charnetsky ......................... 179/100.2 |
| 3,119,989 | 1/1964 | Wasylenko ........................... 340/174.1 |
| 3,148,248 | 9/1964 | Johnson .............................. 179/100.2 |
| 3,170,149 | 2/1965 | Koskie et al. ....................... 340/174.1 |
| 3,177,493 | 4/1965 | Durlofsky . |
| 3,181,166 | 4/1965 | Levene ..................................... 346/74 |
| 3,217,302 | 11/1965 | Hagen .................................. 340/174.1 |
| 3,375,506 | 3/1968 | Bruehl .................................. 340/174.1 |
| 3,453,611 | 7/1969 | Laermer ............................... 340/174.1 |
| 3,516,081 | 6/1970 | Horsfall et al. ...................... 340/174.1 |
| 3,579,212 | 5/1971 | Gabor . |
| 3,678,211 | 7/1972 | Hoogendorn ..................... 179/100.2 P |
| 3,839,734 | 10/1974 | George et al. ........................... 360/102 |
| 3,855,625 | 12/1974 | Garnier .................................... 360/103 |
| 3,907,079 | 9/1975 | Chapman ................................ 188/290 |
| 3,939,495 | 2/1976 | Nagai et al. ............................. 360/103 |
| 4,218,715 | 8/1980 | Garnier .................................... 360/103 |
| 4,366,519 | 12/1982 | Maruyama et al. . |
| 4,484,201 | 11/1984 | Fujisawa ............................. 346/139 C |
| 4,626,941 | 12/1986 | Sawada et al. ........................... 360/97 |
| 4,633,351 | 12/1986 | Bardos et al. . |
| 4,701,820 | 10/1987 | Mc Clare ................................. 360/125 |
| 4,701,823 | 10/1987 | Sakurai ................................... 360/106 |
| 4,757,402 | 7/1988 | Mo .......................................... 360/103 |
| 4,789,913 | 12/1988 | Gregory et al. ..................... 360/97.03 |
| 4,795,275 | 1/1989 | Titcomb et al. ........................ 384/107 |
| 4,901,185 | 2/1990 | Kubo et al. .............................. 360/104 |
| 4,931,338 | 6/1990 | Toffle ........................................ 428/65 |
| 4,960,609 | 10/1990 | Homola et al. ........................... 427/38 |

OTHER PUBLICATIONS

Solid State Technology, Oct., 1988, Tech Notes, A New 2–½ Inch Thin Film Disk, By Pearce, Rice & Tang.

Communication from European Patent Office forwarding European Patent Search Report.

IBM Technical Disclosure Bulletin, vol. 31, No. 1, Jun. 1988 "Method of Prolonging the Life of Magnetic Disk Storages".

IBM Technical Disclosure Bulletin by Friedman and Marchese (Lubricants for Magnetic Recording Media).

I Brake for Whales by B. Whyte.

Characterization of Lubricant/Solid Interfaces by FTIR by R.S. Timsit et al., pp. 98–104.

Quality Control and Standardization of Magnetic Recording Disks by Columbia Univ. Prof. V. Castelli.

Dynamics of Air–Lubricated Slider Bearings for Non–Contact Magnetic Recording by T. Tang.

Dynamic Characteristics of Air–Lubricated Slider Bearing for Noncontact Magnetic Recording, 2 articles by K. Ono.

A Uniform Flying Height Rotary Actuated Air Bearing Slider (IEEE Transactions) article by J. White.

Motion Pictures of In–Situ Air Bearing Dynamics (IEEE Transaction) article by S. Millman et al.

An Air Bearing Slider With Uniform Flying Height and Fast Take–Off Characteristics (ASLE) article by J. White.

IBM Technical Disclosure Bulleting by R. Watrous vol. 22 No. 1, Jun. 1979.

Submicron Spacing of Air–Lubricated Slider in a Disk File with Swinging Arm Actuator (IEEE Transactions) by N. Tagawa.

High Density Magnetic Recording Heads for Disk (IEEE Transactions) by S. Suzuki et al.

Atmospheric Corrosion of Magnetic–Film Structures by S. Doss et al.

Non–Repeatable Flutter of Magnetic Recording Disks (IEEE Transactions) by G. Bouchard et al.

Theoretical and Experimental Investigation of the Dynamic Flying Characteristics of 3370–Type Sliders in 5–¼ Inch Disk Drives (IEEE Transactions) by D. Miu et al.

On Non–Linear Response of Head–Disk Interface to Wavy Excitation (IEEE Transactions) by V. Ponnaganti et al.

Space Fluctuation of Flying Head Sliders in Track Accessing (Forced Vibration Analysis Using Finite Element Method) (ASLE) article by K. Argua et al.

Noise in High Performance Thin–Film Longitudinal Magnetic Recording Media (Invited) (IEEE Transactions) article by N. Belk, et al.

Dynamic Characteristics of a Magnetic Head Slider (IEEE Transactions) article by Y. Mizoshita et al.

New Method of Detecting Contact Between Floating–Head and Disk (IEEE Transactions) article by T. Kita et al.

The Relationship Between Disk Surface Acceleration and Head–To–Disk Interaction (IEEE Transactions) article by D. Richards et al.

Advanced Technology for High Recording Density Disk Storage (IEEE Transactions) article by R. Kaneko.

Novel Piezoelectric Tranducers to Monitor Head–Disk Interactions (IEEE Transactions) article by C. Yeack–Scranton.

Precise Optical Measurement of Slider Dynamics (IEEE Transactions) article by G. Best et al.

Laser Doppler Interferometry on Magnetic Recording Systems (Invited) (IEEE Transactions) by D G. Bogy et al.

The Establishment of Standard Reference Surfaces for Rigid Magnetic Disks with High Recording Density (ISSN) by J. Hartmann.

IBM Technical Disclosure Bulletin, vol. 28, No. 2, Jul. 1985 (Lubricant–Stabilizing Structure for Magnetic Disks).

WET RIGID DISK DRIVE ASSEMBLY WITH A CONICAL SPINDLE BEARING

CROSS REFERENCE TO RELATED APPLICATION

This application contains disclosure which overlaps the disclosure of co-pending U.S. patent application Ser. No. 07/259,344, entitled "INFORMATION RECORDING APPARATUS WITH A LIQUID BEARING", filed Oct. 17, 1988, and commonly assigned with this application. This is a continuation (FILE WRAPPER) of application Ser. No. 07/314,999 filed Feb. 24, 1989 abandoned.

BACKGROUND OF THE INVENTION

The invention is in the field of computer data storage, and more particularly concerns the configuration of the head-disk-actuator (HDA) in a disk drive assembly within which a liquid lubricating material is circulated to provide a liquid bearing for spacing a head with respect to a rotating rigid disk at a very low flying height, to continuously clean the internal environment of the assembly, and to permit the use of a porous, open conical bearing for the spindle upon which the disk rotates.

As is known, prior art disk drive assemblies use a hub structure which supports a rotating rigid disk and is bearing-mounted within the enclosure structure of an HDA assembly. The orientation of the hub structure within the assembly is typically upright or cantilevered. In either case, the hub assembly is mounted for rotation on a rolling bearing assembly, usually of the ball bearing type. Such assemblies are well explained in Volume II of *Magnetic Recording*, edited by C. D. Mee et al., and published in 1988; see, in particular, pages 49–55.

In the prior art disk drive assembly, the internal environment is dry, and the bearings are integrally lubricated. In this regard, dessicated air is circulated in the assembly, while the bearings are packed with lubricant, assembled, and installed as integral units.

The air is circulated and filtered within the interior of the disk assembly in order to remove contaminating particles from the head-disk interface, which extends the life of the disk by reducing wear and tear of its surface. Conventionally, the air is circulated using either an open-loop or closed-loop air system.

Recently, dramatic reductions in the size of hard disk drive assemblies have been made. Assemblies which incorporate disks with diameters as small as 2.5 inches have been marketed. To date, all disk drive assemblies for hard disks utilize rolling bearing assemblies in the spindle mechanisms. In all disk sizes, ball and roller bearings form significant points of failure of the drive assembly. In the miniaturized disk drive assemblies, the small bearings are very susceptible to brinelling, a mode of failure whereby the stresses at the point contact of the balls within the bearing exceed the strength of the balls' steel, thereby initiating monotonic deterioration of the bearing. Relatedly, during manufacture, all hard disk drives are assembled on rubber cushions to provide suspension of the spindle assembly and its rolling bearings. The suspension is required since even minor impacts of the disk drive can destroy or significantly damage the bearings. When placed into a computer, a disk drive assembly is mounted on a mechanical suspension acting between the assembly and the chassis of the computer. This mechanical suspension is usually an integral part of the disk drive assembly; since the suspension is fixed in place, it forms the single most serious barrier to removeable disk drive assemblies.

In U.S. patent application Ser. No. 07/259,344, entitled "INFORMATION RECORDING APPARATUS WITH A LIQUID BEARING", filed Oct. 17, 1988, and commonly assigned with this application, the principle of a liquid bearing that supports the flight of a head on a rotating rigid disk was introduced. The unexpected result of using a liquid bearing is the provision of very low flying heights for the head with respect to the disk, and the concomitant increase in storage density. This worthy concept can provide benefits in personal computer technology, where miniaturization, ruggedness, and data compaction are significant goals. The challenge presented by use of a liquid bearing is to engineer a disk drive assembly environment in which the liquid forming the head-disk bearing is collected and recirculated to the head-disk interface after being thrown off the disk by the centrifugal force of the disk's rotation.

Unconstrained transfer of the liquid bearing material off of the disk during rotation establishes a "wet" environment in which the liquid material is free to circulate within the HDA assembly. Once the prospect of the wet environment is admitted, it provides opportunity for design elaborations that further improve the HDA for hostile environments. The liquid employed to form the liquid bearing is a low viscosity lubricating liquid with a high viscosity index that supports stable spacing of a head and rotating disk down to one microinch, or less.

SUMMARY OF THE INVENTION

The invention is based upon the inventors' joint observation that acceptance of the wet environment in which a lubricating liquid is spun off of a rotating rigid disk can provide at least two unexpected benefits, if the liquid is collected and recirculated within the HDA. First, since the liquid circulates from the head-disk interface across the disk, and traverses the space between the edge of the disk and the HDA enclosure, the liquid will collect and transport contaminating particles from the head-disk interface to the enclosure. Next, the circulating lubricant obviates the need for an integrally lubricated, rolling bearing assembly and permits the use of a porous, open conical bearing that provides radial and axial positioning of the HDA spindle.

The invention is summarized as a wet disk drive assembly, including a disk and spindle assembly in which a rigid disk is mounted on a spindle and the spindle is rotatably mounted to a disk drive enclosure for rotating the disk in a disk operating space within the disk drive enclosure. A liquid lubricating material is provided in the disk operating space and is circulated in the space by a wicking material which contains the lubricating material and which is connected to a wicking applicator that delivers the liquid lubricating material to the disk surface. When the disk is rotated, it provides for the return of excess liquid lubricating material from its surface to the wicking material by spinning the liquid lubricating material to the wicking material within the disk drive enclosure.

The disk drive assembly further includes a non-rolling bearing assembly with a first, rotatable portion on which the rigid disk is mounted, and a second, stationary portion that positions the first rotatable portion and the rigid disk in the disk operation space for rotation. In the invention, the first, rotatable portion and the second, stationary portion of the bearing assembly are rotatably joined by a conical, or a frusto-conical bearing interface. A lubricating assembly acts between the bearing assembly and the wicking material for delivery of the liquid lubricating material to the bearing interface. Preferably, the lubricating assembly includes a porous material of which one of the bearing portions is formed, and contact between the porous material and the wicking material.

It is therefore a primary objective of this invention to provide a wet disk drive assembly in which a liquid lubricating material is continuously recirculated from the surface of a rotating disk through a return path in the the assembly back to the interface between the disk and a head.

Another objective is to provide, in a head-disk-actuator assembly with a wet environment, a spindle having an open conical bearing that supports radial and axial positioning of the spindle in the disk drive assembly.

These and other objects and distinct advantages of this invention will become evident when the following detailed description is read to reference with the below-described drawings.

DESCRIPTION OF THE PREFERRED EMBODIMENT

Figure 1:
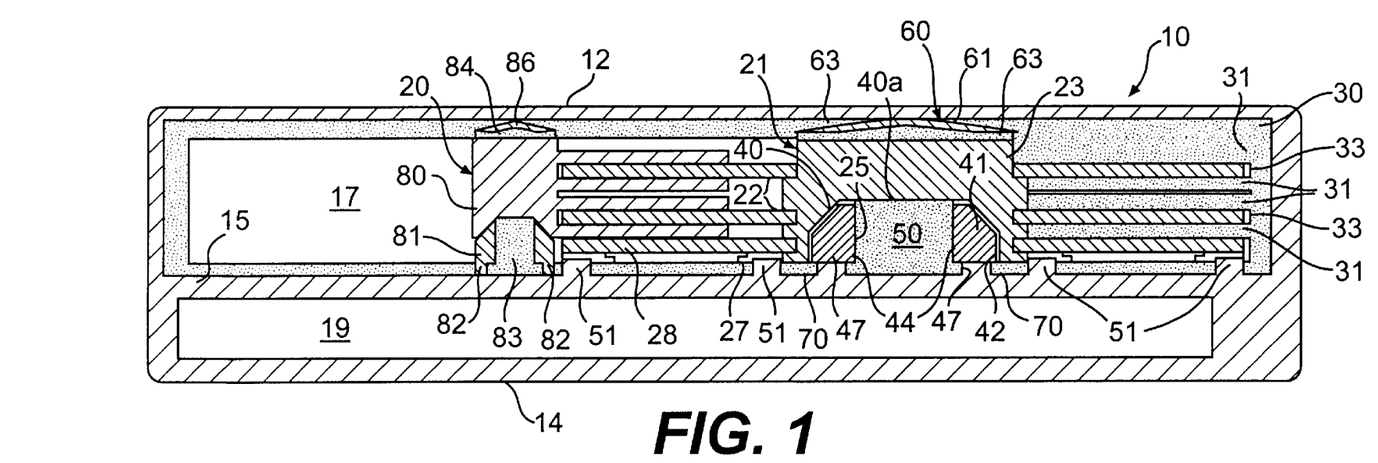
FIG. 1 is a side, cutaway elevation view of a disk drive assembly illustrating a wet disk drive assembly environment, a spindle with a first embodiment conical bearing, and a head actuation assembly, also with a conical bearing.

Refer now to FIG. 1 in which a disk drive assembly is shown in side cutaway, and includes an outer drive case 10 having upper and lower case walls, 12 and 14, and a central planar surface 15 positioned between the top and bottom walls to form a disk operating space 17 and a space 19 to hold the disk drive electronics (not shown).

Within the disk operating space 17 there is positioned a head-disk-actuator (HDA) assembly including a head actuation assembly 20 and a hub assembly 21. The hub assembly 21 includes a pair of rigid magnetic disks 22 of the conventional Winchester type mounted on a spindle assembly consisting of an upper, rotatable portion 23 and a lower, stationary portion 25.

Provision is made for rotating the upper portion 23 on the lower portion 25 by way of a brushless motor with a stator portion 27 fixed to the central planar portion 15 and rotor portion 28 fixed to the upper spindle portion 23 proximate to the stator 28. When energized, the stator and rotor act conventionally to cause the upper portion 23 to rotate with respect to the stationary lower portion 25. Rotation of the upper portion causes rotation of the disks 22 fixed to the upper portion. Rotation of the disks is for the conventional purpose of direct access storage of computer data.

Arrayed in the disk operating space 17 of the assembly 10 is a wicking material 30. The wicking material is attached to the interior of the casing 10, and may entirely line the interior surface of the disk operating space 17. Alternatively, the wicking material 30 may be attached to less than all the interior surface of the disk operating space 17; however, in the embodiment illustrated in FIG. 1, the wicking material is attached to form at least a continuous, unbroken path between the upper and center surfaces 12 and 15. The material 30 is preferably a material which will conduct a liquid by capillary action, and thus may be, for example, a non-fibrous filter paper. In this form, the wicking material can be stamped from sheets of filter paper or the filter paper material may be formed into a preferred conductive path configuration and then glued to the interior surface of the disk operating space 17. Alternatively, the inventors contemplate that the wicking material may be applied by a flocking process in which glue is applied to the interior surface of the disk operating space 17 in a pattern defining a liquid conducting path and a flocking material comprising loose fibers is applied to the pre-applied pattern of glue.

As illustrated in FIG. 1, the wicking material 30 includes wicking applications in the form of finger extensions 31 which jut out from the wicking material 30, parallel and adjacent to the magnetic disks 22.

Fundamental to the invention is the provision of a liquid lubricating material in the wicking material 30, which is continuously conducted by the wicking material's capillary action. The liquid conduction is differentially driven, in that the liquid is conducted by the material 30 from locations that are relatively wet, or saturated, to relatively dry locations. The fingers 31 provide liquid conductive paths directly to the surfaces of the magnetic disks 22.

In operation, the wicking material 30 is initially saturated with the liquid lubricating material, causing some of the liquid to be conducted by the fingers 31 to the surfaces of the disks 22. When the disks rotate, the liquid on the surfaces provides a bearing interface between the disk surfaces and the heads carried by the assembly 20 which exchange magnetic data with the disks. The complete description of the head-disk interface is in the previously-mentioned, commonly assigned patent application, which is incorporated herein by reference in its entirety.

As the disks achieve their intended speed of rotation, the liquid on their surfaces is moved by the centrifugal force of the disks' rotation to the edges of the disks and spun off in the equatorial planes of the disks. The wicking material forms a partial annular ring in the equatorial planes of the disks in order to efficiently collect the liquid material which is spun off. Thus, as the disks operate, the concentration of liquid in the material locations 33 which coincide with the equitorial planes of the disks 22 will become relatively great, with the liquid being conducted by capillary action of the material 30 away from those locations. As the liquid is transferred from the fingers 31 to the surfaces of the disks, the fingers will become relatively dry with respect to the locations 33, with the result that the liquid will be conducted from these locations, out through the fingers, and back to the surfaces of the disks.

It should be evident that, as the liquid is recirculated from the surfaces of the disks 22 through the wicking material 30 and back to the surfaces, contaminating particles will be carried by the liquid into the material and trapped in the equitorial planes of the disks 22.

The continuous recirculation of the liquid lubricating material within the wicking material 30 provides the opportunity for use of an open frusto-conical bearing composed of the upper and lower bearing portions 23 and 25. As illustrated, the upper bearing portion 23 forms the rotatable portion of the HDA spindle. As illustrated in FIG. 1, the upper portion 23 is formed from a porous ceramic material which can conduct the lubricating material by capillary action. The upper portion 23 includes a concave, frusto-conical bearing surface 40. In FIG. 1, the second portion 25 has a first, annular pivot portion 41 formed from a hard, bearing-grade material such as stainless steel.

The choice of materials for the upper and lower spindle portions can differ from that illustrated. For example, both upper and lower portions can be made from non-porous, bearing-grade material, such as stainless steel.

The pivot portion 41 has a convex frusto-conical bearing surface 42 which is shaped to fit closely to and join the concave bearing surface 40. The pivot portion 41 is fastened to the central planar surface 15 by means of four pads, two illustrated by 44, each of which is attached to an extension 47 of the surface 15. The four pads 44 and the annular configuration of pivot portion 41 accommodate an upward extension 50 of the wicking material 30. The upper extension 50 contacts the surface 40a of the upper bearing portion, which transitions to the conical portion 40. The stator assembly 27 is mounted on eight standoffs, four indicated by 51, to allow the wicking material to form a continuous path from wicking material 30 to the upward extension 50. Since the upward extension 50 is continuous with the wicking material 30 it forms a conductive path from the wicking portions 33, through the interior of the lower bearing portion 25, to the surface 40a. Through this path, the bearing interface is lubricated during operation.

Figure 2:
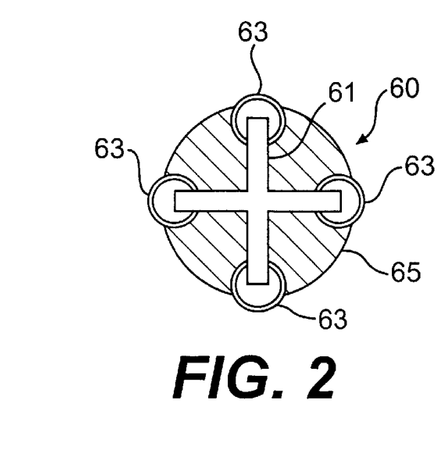
FIG. 2 is the top view of an arrangement for retaining the spindle illustrated in FIG. 1 on its pivot.

To complete the description of the frusto-conical spindle bearing in the HDA of FIG. 1, the upper, rotating bearing portion 23 is rotatably joined with the stationary portion 25 by means of a thrust washer assembly 60, illustrated in FIGS. 1 and 2. The thrust washer assembly includes a metallic, cross-shaped thrust washer 61, of the Bellevue type, for example, to each extension of which is attached a porous ceramic pad (or stainless steel) 63. The washer 61 is retained against, or fastened to, the upper surface 12 of the drive case 10. The Bellevue washer 61 and attached pads act between the upper wall 12 and the upper surface 65 of the bearing upper portion 23. The washer mechanism 60 provides a high thrust force directed along the axis of the spindle bearing to retain the upper portion 23 in rotatable engagement with the lower bearing portion 25.

As illustrated in FIGS. 1 and 2, the wicking material 30 extends down through the washer assembly 60 to contact the upper surface 65 of the bearing upper portion 23. This provides a conductive path for the liquid lubricant from the wicking material 30 to the interface between the pads 63 and the top surface of the upper spindle portion 23.

As the upper spindle portion 23 is rotated by the brushless motor, the bearing interface is lubricated by conduction of liquid lubricant through the extension 50 to the surface 40a. The centrifugal force of rotation of the bearing forces the liquid lubricant outwardly on the surface 40a, and then downwardly along the conical interface between surfaces 40 and 42, and out through the bottom of the interface at 70, where it reenters the wicking material 30. The flow of the lubricating material to the conical bearing interface through the extension 50 can be enhanced by an ancillary pump which will increase the liquid pressure at the bearing interface; spiral etching of one or the other of the bearing surfaces 40 and 42, will also encourage movement of the liquid lubricant along the interface.

It is to be observed that the exhaustion of lubricant from the conical bearing at 70 protects the surface of the disks 27 from debris originating in the bearing. All such contamination is trapped in the wicking material beneath 70 and filtered out of the lubricant before it reaches the disk.

The conical bearing provides an improved performance with respect to the prior art spindle bearings. As discussed above, the rolling bearings of the prior art spindles, based upon ball- or roller-bearings, constitute one of the primary failure mechanisms of prior art spindles. Further, the rolling bearings of the prior art spindles cause non-repeatable run-out (NRRO) dependent upon the axial load of the bearings. As is known, NRRO degrades disk performance by shifting a disk track with respect to the head currently reading or writing the track. In contrast, the conical bearing of the invention provides a spindle bearing with non-rolling parts that operates to axially and radially align the bearing portions without NRRO. Use of the conical bearing of FIG. 1 in prior art disk drives is unobvious because such bearings tend to pump the lubricant out of the bearing interface due to centrifugal action. As all of the prior art disk drive assemblies are "dry," they require bearing designs which integrate and maintain the bearing lubricant within the bearing assembly. This leads, naturally, to the use of rolling-type bearing assemblies which can be manufactured and assembled into the prior art disk drive spindles in a closed form retaining the lubricant within the bearing. However, the opening of the disk operating space environment to the free flow of a liquid lubricant frees the prior art disk drive spindle design from the need to retain lubricant within the spindle bearings, thus, giving birth to the possibility of the conical bearing included in this invention.

As FIG. 1 illustrates, the head actuator assembly 20 of the HDA also incorporates an open conical bearing in which a moveable pivoting portion 80 has a lower frusto-conical concavity which interfaces with a convex frusto-conical surface of a lower, stationary pivot. The stationary pivot 81 is fastened to the surface 15 by four lower extensions 82. The pivot 81 is annular and has a central opening through which an extension 83 of the wicking material rises to conduct the liquid lubricant which lubricates the conical interface. The rotating portion 80 is held in rotatable conduction with the pivot 81 by a Bellvue washer assembly 84, which is fastened to the top casing wall 12. The Bellvue washer assembly 84 permits an extension 86 of the wicking material to lubricate the top surface of the rotating spindle portion 80.

Figure 3:
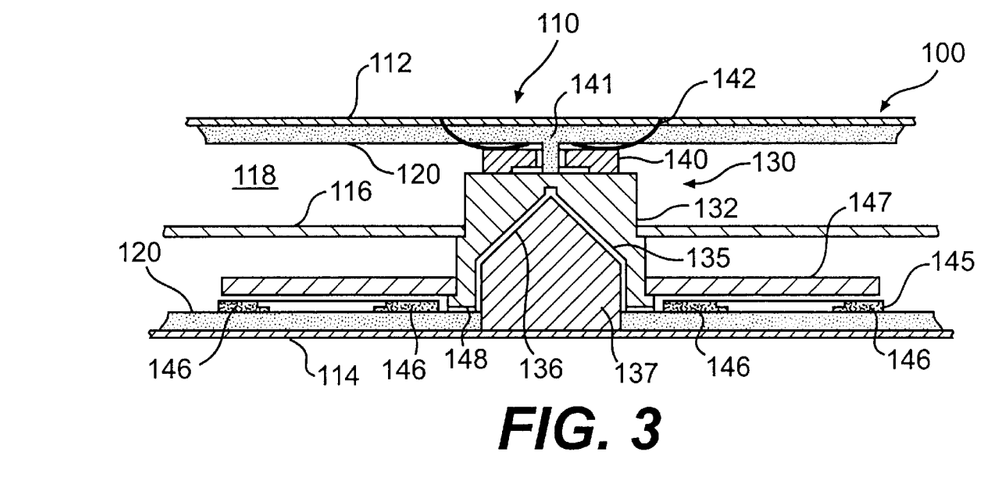
FIG. 3 illustrates a side, cutaway elevation view of a wet disk drive assembly having a spindle with a second embodiment conical bearing.

Refer now to FIG. 3 in which a second embodiment of a conical spindle bearing for a disk-drive assembly 100 is shown in side cutaway. The assembly 100 includes an outer drive case 110 having upper and lower case walls 112 and 114 in which a rigid magnetic disk 116 of the Winchester type is mounted for rotation. The outer case 110 encloses an interior disk operating space 118 forming a closed environment within which the disk 116 rotates for conventional magnetic storage of computer data. The interior surface of the case 110 is lined with a porous wicking material 120. It is asserted that the wicking material 120 is saturated with a liquid lubricating material which is recirculated by means discussed above. The lubricating material is applied to the surface of the disk 116 and, when the disk 116 rotates during operation, is thrown off of the disk in the disk's equatorial plane back to the wicking material 120.

When the disk 116 spins, the portion of the wicking material 120 which is in the equatorial plane of the disk 116 becomes saturated with liquid lubricating material, with the excess liquid lubricating material being conducted by capillary action throughout the wicking material, and returned to the bearing interface from the wicking material.

As illustrated, a spindle assembly 130 which supports the disk 116 for rotation includes a rotatable upper bearing portion 132 having a generally conical interior interface surface 135 which receives the upper conical bearing surface 136 of a stationary steel pivot 137. The steel pivot 137 is mounted on the bottom wall 114 of the case 110, while the upper bearing portion 132 is held against the pivot 137 for rotation thereupon at the conical interface by means of a thrust bearing 140 retained axially against the upper bearing portion 132 by a spring clip 142. The spring clip 142 is conventionally retained against or fastened to the upper case wall 112, where it acts between the thrust bearing 140 and the wall to exert a force against the upper bearing portion 132, thrusting it axially against the stationary pivot 137. As shown, the thrust bearing 140 has a central opening through which an extension 141 of the wicking material 120 extends.

The upper bearing portion 132 is manufactured of the porous ceramic material mentioned above, which conducts the liquid lubricating material by capillary action from the extension 141 down to the conical bearing interface between the surfaces 135 and 136. The stationary pivot 137 is manufactured of stainless steel and is fixed to the bottom casing wall 114.

Alternatively, the pivot 137 can be made of the porous ceramic material, and the upper bearing portion 132 of stainless steel. In this case, the conical bearing interface would be lubricated by conduction of liquid lubricant from wicking material on the lower case wall 114 through the porous ceramic material of the stationary pivot.

The upper bearing portion 132 is rotated on the pivot 137 by a brushless motor including a stator 145 fixed to the bottom casing wall 114 by standoffs 146 and a rotor 147 mounted against a lower annular lip 148 of the upper bearing portion 132. The standoffs provide a continuous wicking path for the wicking material 120 to conduct the liquid lubricanting material to or from the pivot 137.

The means of returning the liquid lubricating material to the surface of the disk 116 and the the material extension 140 includes the means and procedures described above in connection with FIG. 1.

Figure 4A:
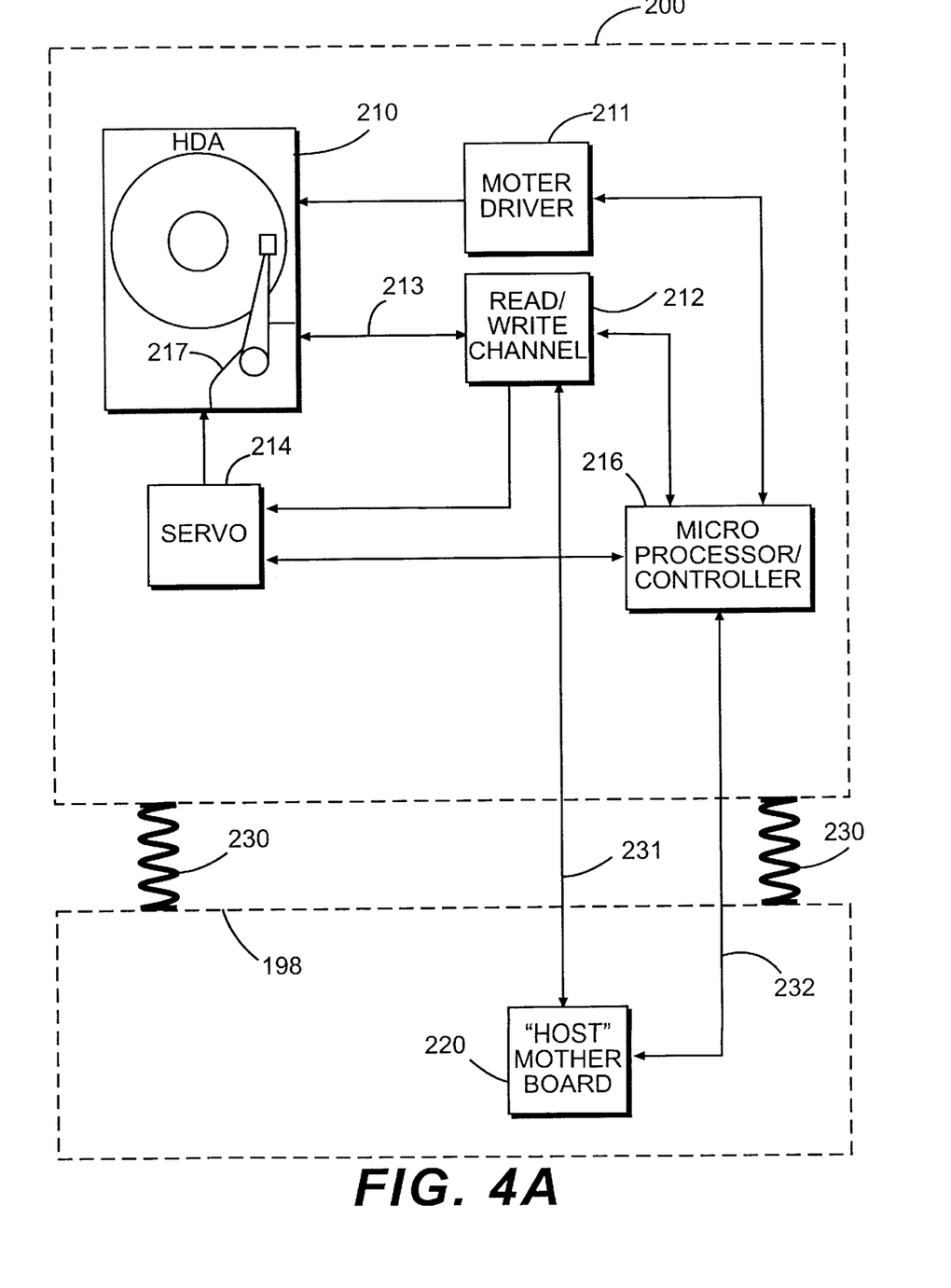
FIGS. 4A and 4B are schematic diagrams showing how an HDA is physically mounted and electrically interconnected in a computer, FIG. 4A illustrating the prior art, and FIG. 4B illustrating the invention.
Figure 4B:
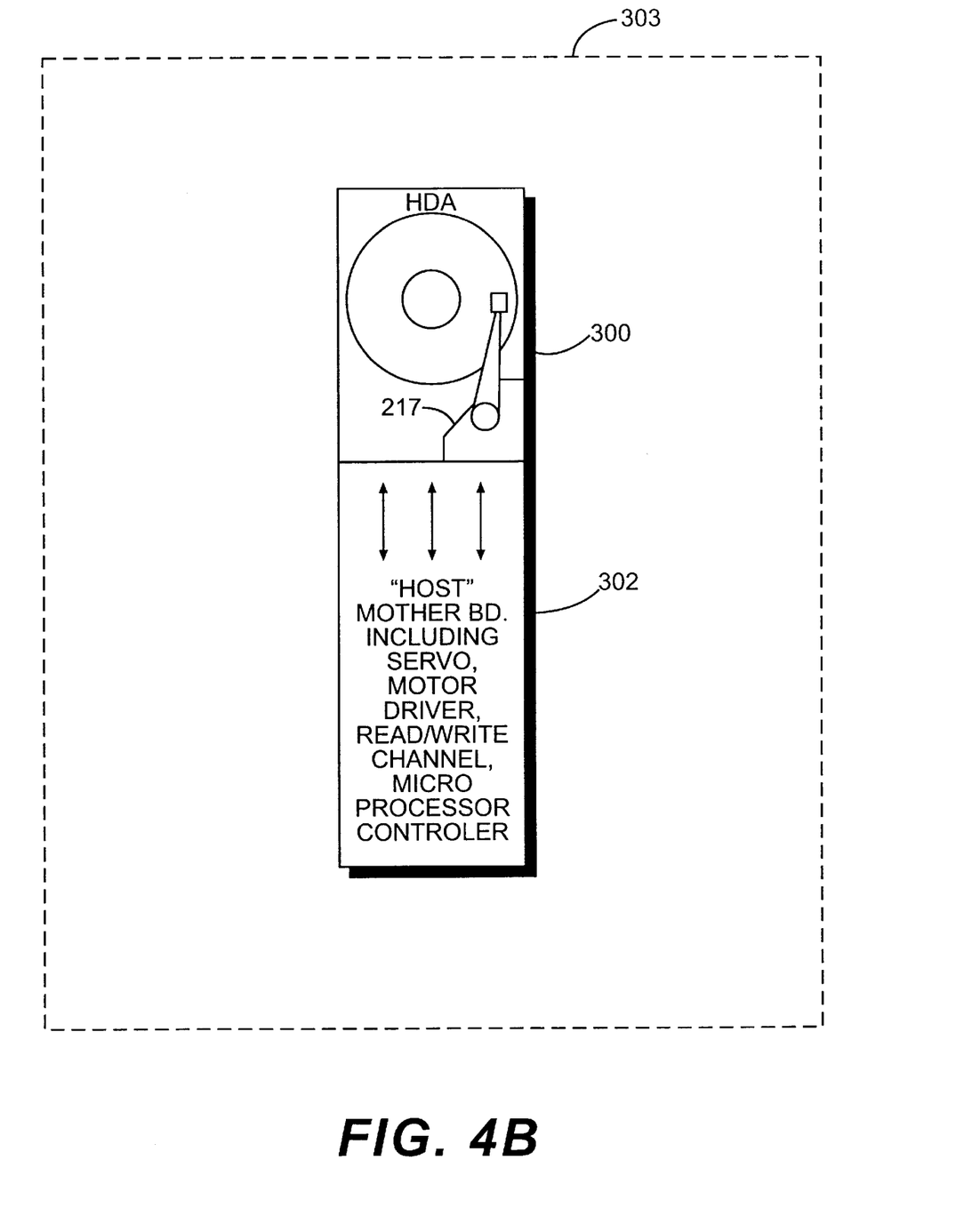

A signal advantage provided by a wet disk drive assembly which includes a conical spindle bearing is illustrated in FIGS. 4A and 4B. In FIG. 4A, the conventional prior art mode of mounting a disk drive unit in a computer is illustrated. In FIG. 4A, a disk drive assembly 200, comprising a self-contained unit which is mounted to the chassis of a computer 198 includes an HDA 210, an interfacing motor driver 211, a read/write channel 212, a head actuator servo 214, and microprocessor/controller 216. The motor driver 211 is connected to drive the brushless electric motor which rotates the spindle and attached disk in the HDA 212 as described above. The read/write channel 212 comprises one or more bi-directional, coded data channels, represented by the signal line 213, each operating through a respective one of the heads mounted on the head actuator assembly 211 of the HDA. The channel 212 operates conventionally in conjunction with a servo 214 which positions the read/write heads in the HDA as required for storing or retrieving coded data. The micro-processor/controller 216 operates as a control "plug" through which the servo 214 and the motor driver 211 are operated. The processor/controller 216 provides information to the channel 212 indicating when, and where, a head has been positioned in the HDA for reading or writing. A "host" mother board 220 forms the primary data interface with the channel 212 and the primary control interface with the processor/controller 216.

In the conventional arrangement of FIG. 4A, the disk drive assembly 200 is permanently mounted within the computer 198 by means of a frame with a shock mounting suspension 230, which is provided to mechanically isolate the disk drive 200 from the computer 198, thereby protecting it from the effects of the mechanical environment within which the computer 198 is operated. Typically, the mother board 220 is a printed circuit board which is mounted in the computer 198. The mother board includes a backplane and a number of pluggable interfaces into which circuit card modules can be inserted. The data and control signal interfaces between the mother board 220 and the disk drive 200 are symbolized by data paths 231 and 232, respectively, which usually comprise wire bundles connected to the mother board 220.

With the wet environment illustrated above permitting the use of a liquid bearing to support "flight" of a magnetic head with respect to a rotating disk, and an open conical bearing for the spindle and actuator assemblies in the disk drive assembly, the HDA of a disk drive assembly can be mounted directly onto a mother board by conventional rigid or pluggable mounting means. The liquid head-disk bearing and the open conical bearings of the spindle and head actuator provide a high resistance to shock and vibration, thereby eliminating the need for shock mounting or other mechanical suspension of the HDA. Thus, as illustrated in FIG. 4B, the HDA 300 of a disk drive assembly can be mounted directly to a host mother board 302 of a computer 303. This eliminates the need for a frame and suspension for mounting the assembly, as well as precautionary steps required for manufacture and assembly. It is asserted that with the configuration of FIG. 4B, the mother board 302 can carry all of the electronics necessary to operate the HDA 300 including the head actuater servo, a motor driver, read/write channel, and a micro-processor/controller. The routineer will appreciate that this eliminates the necessity for cable interconnection between the disk drive assembly and host mother board. Instead, the interfaces previously served by cables can be integrated into the backplane of the mother board.

Figure 5:
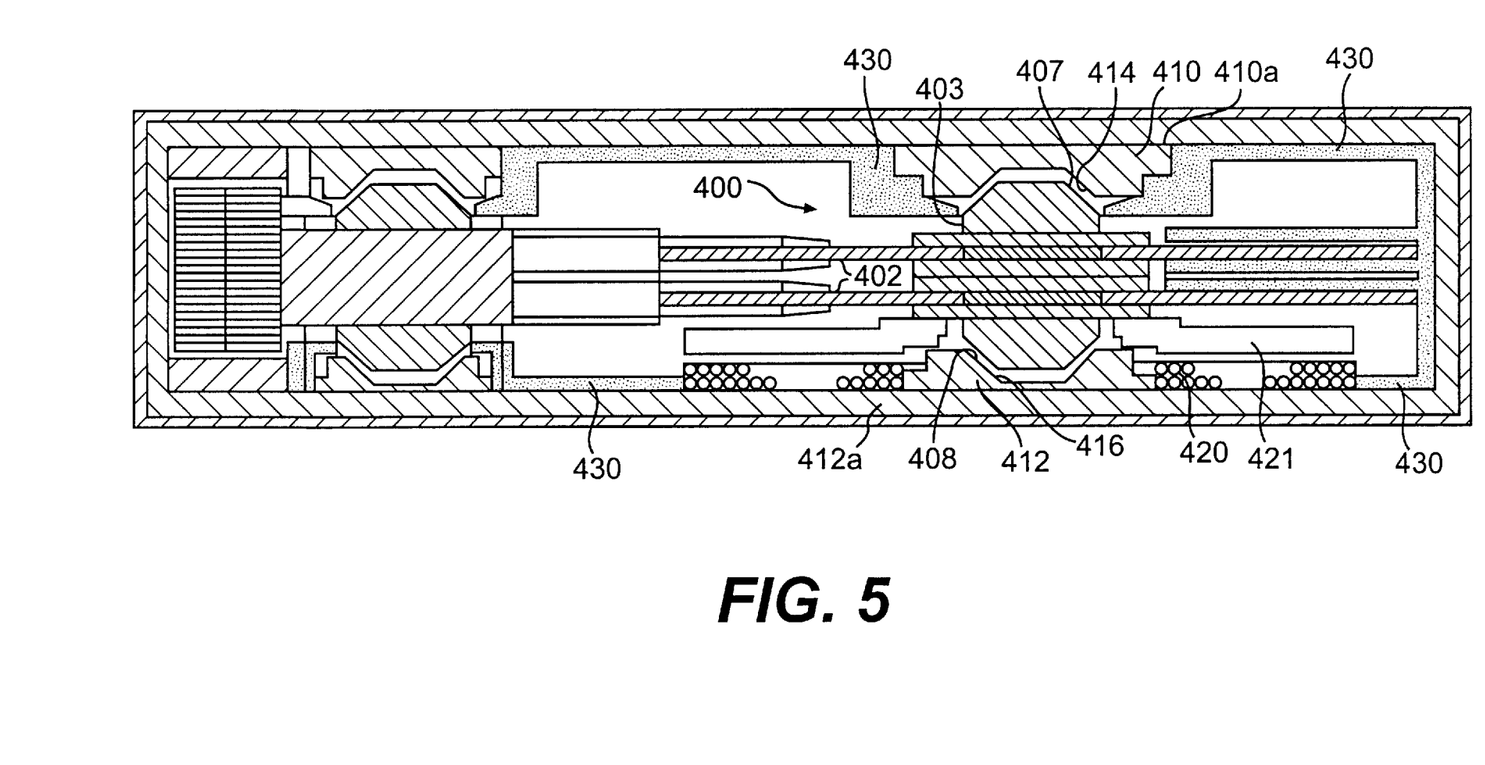
FIG. 5 illustrates a side, cutaway elevation view of a wet disk drive assembly having a spindle with a third embodiment conial bearing.

Refer now to FIG. 5 for third embodiment of a conical bearing to be used in the spindle mechanism of a upper and lower axial conical bearings. This spindle assembly is indicated generally by 400 and carries a pair of rigid magnetic disks 402. The rotatable portion of the spindle includes a stainless steel axle 403 having upper and lower frusto conical surfaces 407 and 408. Upper and lower hubs 410 and 412 are complementarily mounted on the upper and lower walls 410a and 412a of an interior casing held within an outer casing 411. These hubs are formed from a porous material which conducts the liquid lubricant; such a material can include the porous ceramic material referred to above or to a conventional sintered porous bronze material from which oil-lite bearings are made. The hubs 410 and 412 have frusto conical surfaces 414 and 416, respectively. A stator 420 and rotor 421 provide a rotating force for the axle 403 when the stator 420 is energized. As is known, the porous material of which the upper and lower hubs 410 and 412 are formed will conduct the liquid lubricant described above to the bearings interfaces. The lubricant is delivered to the hubs through the wicking material 430 which lines the interior of the disk drive assembly case 432. The wicking material includes fingers 435 for lubricating the disks 402. Although not shown, the stator 420 is discontinuous and provides a path by which the material 430 contacts the lower hub 412.

Obviously, although the description given above illustrates our invention, it should be understood that this description does not limit the disclosed embodiments, and that the invention may be practiced otherwise than is specifically described without departing from the claims, which follow.

What is claimed is:

1. A wet disk drive assembly, comprising:
   a disk drive enclosure;
   a disk and spindle mechanism including a rigid disk mounted on a spindle, said disk including a disk surface for recording information, said spindle being rotatably mounted to said disk drive enclosure for rotating said disk in said disk drive enclosure, said disk and spindle mechanism further comprising:
      a bearing assembly with a first, rotatable portion upon which said rigid disk is mounted, and a second, stationary portion which positions said first, rotatable portion and said rigid disk in said drive assembly for rotation by said drive assembly;
      said first, rotatable portion and said second, stationary portion being rotatably joined at an open bearing interface;
   means for rotating said spindle;
   a wicking material within said disk drive enclosure, said wicking material for transporting said lubricating material within said disk drive enclosure in response to rotation of said rigid disk; lubricating means acting between said bearing assembly and said wicking material for delivery of said liquid lubricating material to said open bearing interface; and
   a wicking applicator for delivery of said liquid lubricating material to said disk surface, said wicking applicator providing a liquid conduction path between said wicking material and said disk surface.

2. The wet disk drive assembly of claim 1, wherein said lubricating means includes a porous material of which said second, stationary portion is formed, said porous material being in contact with said wicking material.

3. The wet disk drive assembly of claim 1, wherein said lubricating means includes a porous material of which said first, rotatable portion is formed, said porous material being in contact with said wicking material.

4. A wet disk drive assembly, comprising:
   a casing enclosed in a drive assembly;
   a capillary means in said drive assembly for passively circulating a liquid within said casing;
   a liquid lubricating material in said capillary means;
   a disk drive mechanism in said drive assembly, said disk drive mechanism including a rigid disk mounted on said disk drive assembly for rotation by said disk drive assembly, said disk drive mechanism further comprising:
      a bearing assembly with a first, rotatable portion upon which said rigid disk is mounted, and a second, stationary portion which positions said first, rotatable portion and said rigid disk in said drive assembly for rotation by said drive assembly;
      said first, rotatable portion and said second, stationary portion being rotatably connected by an open conical or frusto-conical bearing interface; and
      lubricating means acting between said bearing assembly and said capillary means for delivery of said liquid lubricating material to said conical or frusto-conical bearing interface; and
   delivery means mounted in said drive assembly and having a liquid-conductive connection to said capillary means for delivery of said liquid lubricating material to said rigid disk.

5. The wet disk drive assembly of claim 4, wherein said lubricating means includes a porous material of which said second, stationary portion is formed, said capillary means is a wicking material, and said porous material being in contact with said wicking material.

6. The wet disk drive assembly of claim 4, wherein said lubricating means includes a porous material of which said first, rotatable portion is formed, said capillary means is a wicking material, and said porous material being in contact with said wicking material.

7. A disk drive assembly comprising:
   at least one rotatable disk having a recording surface;
   means for mounting and rotating said disk, said means for mounting and rotating comprising:
      a spindle mechanism supporting said disk; and
      means for rotating said spindle mechanism, said spindle mechanism comprising:
         a bearing assembly with a first, rotatable portion upon which said disk is supported, and a second stationary portion which positions said first, rotatable portion and said disk for rotation;
         said first, rotatable portion and said second, stationary portion being rotatably joined at an open bearing interface;
   a liquid conducting material having a portion disposed adjacent to said recording surface;
   a liquid lubricant on said recording surface and saturating said material;
   a portion of liquid lubricant on said recording surface for being propelled from said recording surface in response to rotation of said disk;
   means including said liquid conducting material for providing a liquid conduction path for circulating liquid lubricant that is propelled from said recording surface during disk rotation and for returning said liquid lubricant to said portion of said material adjacent to said recording surface; and lubricating means acting between said bearing assembly and said liquid conducting material for delivery of said liquid lubricating to said open bearing interface.

8. In a computer including a backplane structure for pluggably interfacing computer circuit modules, an improvement for mounting a disk drive assembly in said computer, said improvement comprising:
   a disk drive enclosure;
   a head-disk mechanism in said enclosure including a rigid disk, a spindle mechanism for rotating said disk, and an open bearing for rotatably mounting said spindle in said disk drive enclosure;
   a liquid lubricant;
   a liquid conducting means in said disk drive enclosure for circulating said liquid lubricant to said disk and said open bearing in response to rotation of said disk; and
   suspensionless means for rigidly mounting said disk drive enclosure to said backplane structure.

9. In a drive assembly including a rigid, rotatable magnetic recording medium, said drive assembly including an enclosure and a drive mechanism for rotating said rigid medium in said enclosure, an improved drive assembly spindle, the improvement comprising:

a first, rotatable, spindle portion with means for mounting said recording medium to said first, spindle portion;

a first bearing surface formed in said first spindle portion, said first bearing surface having a first conical contour;

a second, stationary spindle portion with means for mounting said second spindle portion to said enclosure;

a second bearing surface formed in said second spindle portion, said second bearing surface having a second conical contour which is complementary to said first conical contour;

said first and second spindle portions being coupled for rotation of said first spindle portion on a spindle bearing interface at which said first bearing surface meets said second bearing surface; and lubricating means for transferring a liquid lubricant from within said enclosure to said spindle bearing interface in response to rotation of said medium.

\* \* \* \* \*